UNITED STATES PATENT OFFICE.

CHARLES W. WILSON, OF BALTIMORE, MARYLAND.

IMPROVEMENT IN COMPOSITIONS FOR ROOFING.

Specification forming part of Letters Patent No. 148,396, dated March 10, 1874; application filed January 6, 1874.

*To all whom it may concern:*

Be it known that I, CHARLES W. WILSON, of the city of Baltimore and State of Maryland, have invented certain Improvements in Composition for Roofing, covering for the sides of buildings, boat-decks, &c., of which the following is a specification:

My invention relates to improvements on the composition for which Letters Patent No. 46,495 were granted February 21, 1865, to W. L. Potter. That invention consists in the combination of ground slate rock "with any suitable glutinous water-proof material, such as coal-tar, oil, paint," &c., mixed "in such quantities that it (the composition) may easily be spread with a brush or trowel." For a further description of that composition, reference is made to the said Letters Patent. My improvements in that composition consist in the addition to its ingredients of augite, terra-alba, and silex, making the improved compound to consist of substances and in quantities substantially according to the following formula:

Coal-tar, one gallon; ground slate, nine pounds; terra-alba, two pounds; silex, two pounds; augite, three pounds.

The object of my improvements is to make the composition less combustible, and less liable to crack in consequence of changes in temperature.

I claim as my invention—

As an improvement on the compound claimed in Letters Patent No. 46,495, the combination of coal-tar, ground slate, terra-alba, silex, and augite, substantially in the quantities set forth in the within formula, in the manner and for the purpose herein specified.

In testimony whereof I have hereto subscribed my name, in the city of Baltimore, this 23d day of December, in the year of our Lord 1873.

CHARLES W. WILSON.

Witnesses:
    THOMAS MURDOCH,
    WM. T. HOWARD.